Figure 3:
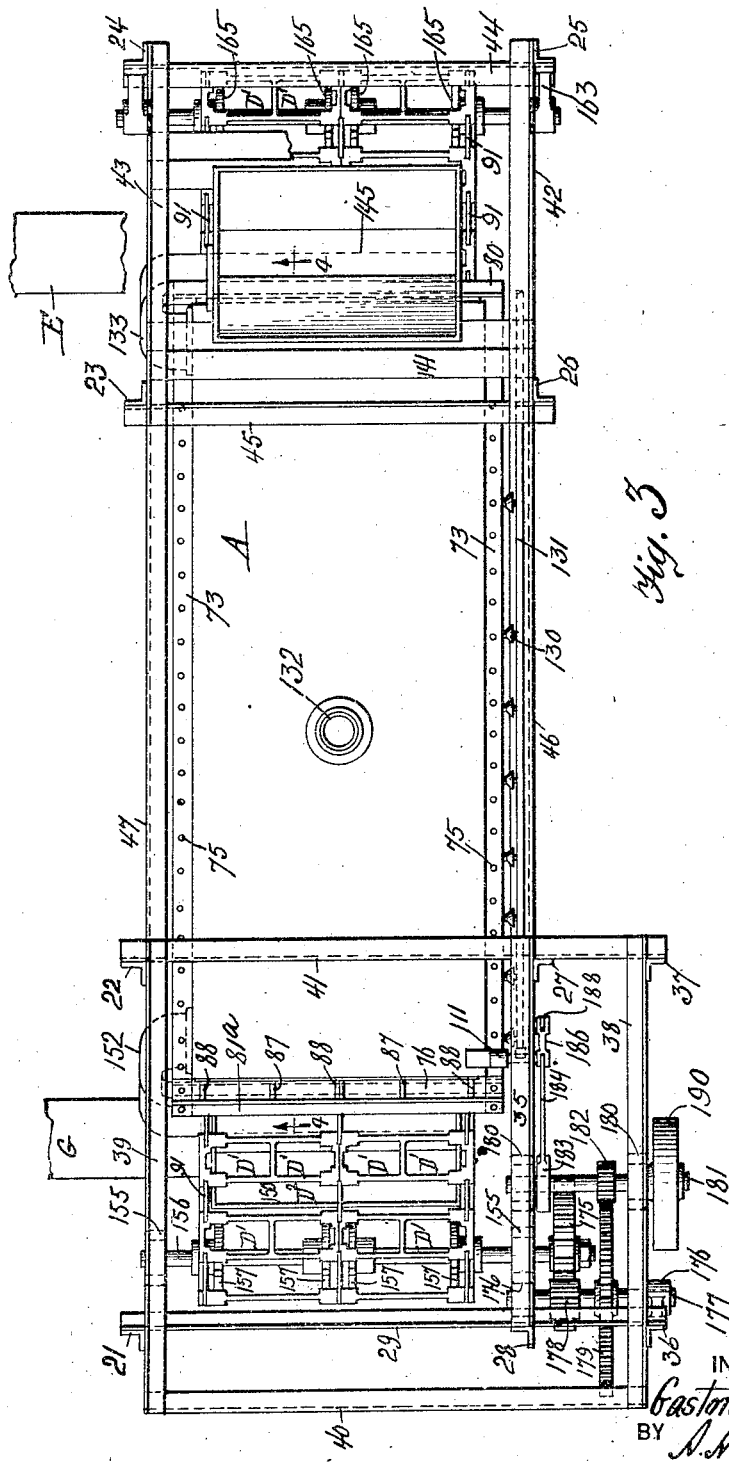

Sept. 8, 1925.                                                 1,552,539
                        G. A. BRONDER
          PROCESS OF EXTRACTING VOLATILE INGREDIENTS
              FROM POWDERED OR GRANULATED MATERIAL
                   Filed Dec. 29, 1921        3 Sheets-Sheet 1
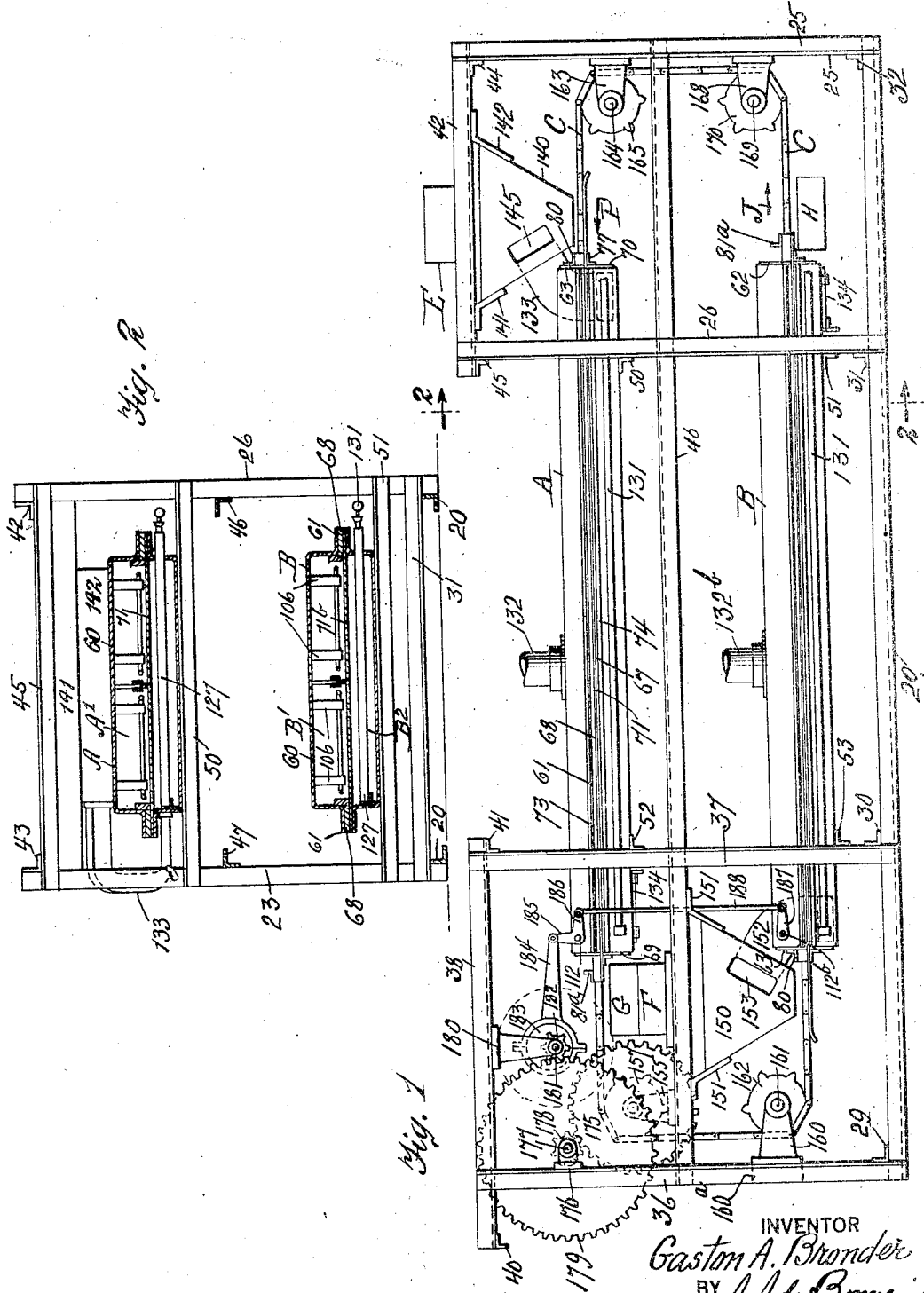
INVENTOR
Gaston A. Bronder
BY
A. A. de Bonneville
ATTORNEY Sept 8, 1925.　　　　　　　　　　　　　　　1,552,539
G. A. BRONDER
PROCESS OF EXTRACTING VOLATILE INGREDIENTS
FROM POWDERED OR GRANULATED MATERIAL
Filed Dec. 29, 1921　　　3 Sheets-Sheet 2

INVENTOR
Gaston A. Bronder
BY A. A. de Bonneville
ATTORNEY

Sept. 8, 1925.  
G. A. BRONDER  
PROCESS OF EXTRACTING VOLATILE INGREDIENTS  
FROM POWDERED OR GRANULATED MATERIAL  
Filed Dec. 29, 1921  
1,552,539  
3 Sheets-Sheet 3
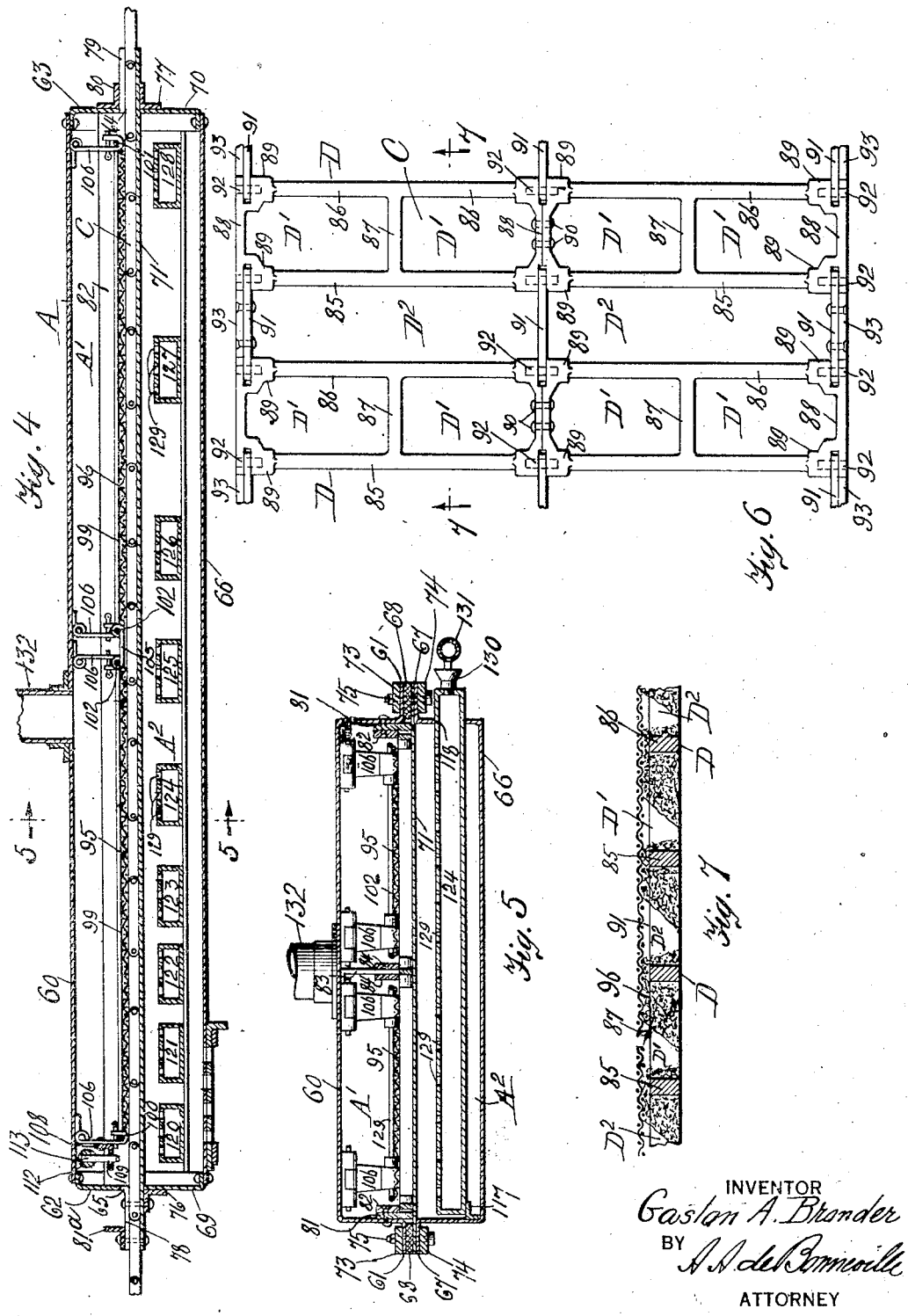

Patented Sept. 8, 1925.

1,552,539

UNITED STATES PATENT OFFICE.

GASTON A. BRONDER, OF BROOKLYN, NEW YORK, ASSIGNOR OF ONE-HALF TO THOMAS COSTIGAN, OF NEW YORK, N. Y.; LUCIA R. BRONDER ADMINISTRATRIX OF THE ESTATE OF SAID GASTON A. BRONDER, DECEASED.

PROCESS OF EXTRACTING VOLATILE INGREDIENTS FROM POWDERED OR GRANULATED MATERIAL.

Application filed December 29, 1921. Serial No. 525,796.

*To all whom it may concern:*

Be it known that I, GASTON A. BRONDER, citizen of the United States, and resident of the borough of Brooklyn, city of New York, in the county of Kings and State of New York, have invented certain new and useful Improvements in a Process of Extracting Volatile Ingredients from Powdered or Granulated Material, of which the following is a specification.

This invention relates to a process of extracting volatile ingredients from powdered or granulated material containing volatile matter. The invention relates specifically to a process of extracting the volatile ingredients from powdered or granulated shale and condensing the vapors generated to produce oil.

The object of the invention comprises steps to extract the volatile ingredients from material like powdered shale, or other material by means of heat. A second object of the invention is to continuously and consecutively impart heat to all the particles of a powdered or granulated material. A third object is to heat the material gradually and also to preheat the material. A fourth object of the invention is to condense the condensable portions of the vapors generated, during the heating of the particles of material, and producing oil. A fifth object is to dispose of the refuse of the material treated. Other objects will appear in the following specification and claims.

An exemplification of apparatus to carry out the steps of the invention is shown in the accompanying drawings, and is similar to the apparatus shown and described in my application for a vapor extractor filed August 13, 1921, Serial Number 491,959, and of which Fig. 1 represents a side elevation of a pair of retorts with their appurtenances; Fig. 2 shows a cross-section of Fig. 1 on the line 2, 2; Fig. 3 indicates a top plan view of Fig. 1; Fig. 4 indicates an enlarged section of Fig 3 on the line 4, 4; Fig. 5 shows a section of Fig. 4 on the line 5, 5; Fig. 6 represents an enlarged fragmentary top plan view of the conveyor of the apparatus and Fig. 7 a section of Fig. 6 on the line 7, 7 with its accompanying screen.

The apparatus to carry out the steps of the invention is represented with a frame, comprising the horizontal bottom angle irons 20, from which extend the vertical angle irons 21 to 28 inclusive. A lower cross angle iron 29 connects the vertical angle irons 21 and 28. A lower cross angle iron 30 connects the vertical angle irons 22 and 27. A lower cross angle iron 31 connects the vertical angle irons 23 and 26. A lower cross angle iron 32 connects the vertical angle irons 24 and 25. A longitudinal angle iron 35 connects the upper ends of the vertical angle irons 27 and 28. At one of the outer ends of the cross angle irons 29 and 30 are respectively fastened the vertical angle irons 36 and 37. To the upper ends of the vertical angle irons 36 and 37 is fastened the outer longitudinal angle iron 38. To the upper ends of the vertical angle irons 21 and 22 is fastened the upper longitudinal angle iron 39. An upper cross angle iron 40 connects the angle irons 38 and 39. An upper cross angle iron 41 is fastened to the vertical angle irons 22, 27 and 37. A longitudinal angle iron 42 connects the angle irons 25 and 26. A longitudinal angle iron 43 connects the vertical angle irons 23 and 24. An upper cross angle iron 44 connects the vertical angle irons 24 and 25 and an upper cross angle iron 45 connects the vertical angle irons 23 and 26. An intermediate longitudnal angle iron 46 connects the vertical angle irons 25, 26, 27 and 28 and an intermediate longitudinal angle iron 47 connects the vertical angle irons 21, 22, 23 and 24. A cross angle iron 50 and a cross angle iron 51 connect the vertical angle irons 23 and 26. A cross angle iron 52 and a cross angle iron 53 connect the vertical angle irons 22 and 27.

A vapor extractor retort designated in its entirety by the letter A, is supported upon and fastened to the cross angle irons 50 and 52. A second vapor extractor retort like A is designated in its entirety by the letter B and is supported upon and fastened to the cross angle irons 51 and The retort A is box-shaped and comprises the U shaped upper member 60 with the flanges 61. The member 60 is connected at its ends to the similar end heads 62 and 63. An inlet opening 64 is formed in the head 63 and an outlet opening 65 is formed in the head 62. A U-shaped bottom member 66 has formed therewith the flanges 67. End heads 69 and 70 are connected to the U shaped member 66. A separating plate 71 is located between the flanges 61 and 67, and divides the retort into the vaporizing chamber $A^1$ and the heating chamber $A^2$. Packing strips 68 preferably of asbestos are located between the flanges 61 and the plate 71. Reinforcing strips 73 are placed upon the flanges 61 and reinforcing strips 74 bear up against the flanges 67. Clamping bolts 75 clamp together the flanges 61 and 67 and their appurtenances. Angle irons 76 and 77 are fastened to the center plate 71 and the heads 69 and 70.

Guide blocks 78 are located upon and fastened to the centre plate 71 and the angle iron 76. Guide blocks 79 are located upon and fastened to the centre plate 71 and the angle irons 77. An adjusting angle iron 80 is fastened to the head 63 and to the block 79 and an angle iron $81^a$ is fastened to the block 78. To the inner side faces of the member 60 are secured the longitudinal guide strips 81 and guide strips 82. From the roof of the member 60 extend brackets 83 with the center guide strips 84 on their opposite faces. A conveyer is designated in its entirety by the letter C and comprises the similar members D. Each of the members D comprises the similar cross walls 85 and 86 which at their middle portions are connected by the longitudinal walls 87. End walls 88 with the hub ends 89 are formed with the similar cross walls 85 and 86. The end walls 88 that are adjacent to each other are riveted together by means of the rivets 90. The walls of each of the members D form the similar conveying compartments $D'$ open at their top and bottom sides and between the members D are formed the conveying compartments $D^2$ open at their top and bottom sides. In each of the hub ends 89 is pivoted one end of a link 91 by means of the pivots 92. Filling strips 93 are riveted to the links 91. The said links 91 with the filling strips 93 and the end walls 88 constitute members of chains for the conveyer C.

In the vaporizing chamber $A'$ are located a pair of oscillating screens 95 and a pair of similar oscillating screens 96. Each screen comprises a practically rectangular frame with the longitudinal members 99, outer cross members 100, 101 and the inner cross members 102. The adjacent cross members 102 are connected by links 105. Each of the cross members is hinged to the member 60, by means of the hinges 106. The hinges 106 that support the cross members 100 are connected by an angle iron 108, which has formed therein openings 109. A journal bearing 111 is supported on the outer face of the member 60. An oscillating shaft 112 is journaled in the bearing 111 and also in a bearing not shown extending from the inner face of the member 60. The shaft 112 has extending therefrom arms 113 and the latter engage the openings 109, and by means of the oscillations of the shaft 112 the screens 95 and 96 are swung over the conveyer C.

To the inner face of one of the longitudinal walls of the heating chamber $A^2$ of the retort A is fastened a supporting angle iron 117 and in the opposite longitudinal wall are formed a plurality of openings 118. A plurality of box shaped gas heaters 120 to 128 have each its back end supported on the angle iron 117 and the other end of each gas heater extends through one of the openings 118. Each of the heaters has openings 129 in its roof, and at the front end of each is connected an air adjuster 130 of a Bunsen burner. Gas piping 131 supplies the burners with gas. The heaters are spaced in the heating chamber $A^2$ so that the spaces between them gradually decrease from the head 70 to the head 69, which heads are respectively at the inlet and outlet ends of the retort A. A vapor outlet pipe 132 extends up from the member 60 of the chamber $A^1$. A waste gas outlet conduit 133 extends from the U shaped member 66 of the heating chamber $A^2$. An air register 134 is slidably connected to the bottom wall of the member 66 of the heating chamber $A^2$.

The vapor extracting retort B as already stated is the same as A, but is reversed in position to A, so that the inlet of the retort B is on the same end of the retort as the outlet of the retort A, and the outlet of the retort B is on the same end of the retort as the inlet of the retort A. A feeding and preheating hopper 140 has connected thereto the angle irons 141 and 142 which latter are connected to the longitudinal angle irons 42 and 43. The waste gas outlet conduit 133 extends to one of the walls of the hopper 140 and registers with the conduit 145, that extends through the hopper and is open at its end opposite to the conduit 133. A feeding cross conveyer E moves over the hopper 140 to feed it fresh powdered shale or other material operated upon. A second feeding and preheating hopper 150 has connected thereto the angle irons 151, which latter are fastened to the longitudinal angle irons 46 and 47. A waste gas outlet conduit 152 extends from the heating chamber $B^2$ of the retort B and registers with the conduit 153, which latter extends through the hopper 150. The latter is open to the atmosphere at its end opposite to the conduit 152. A feeding cross conveyer F moves over the hopper 150 to feed it with fresh powdered shale or other material operated upon. A cross waste shale conveyer G is located below and adjacent to the outlet end of the retort A and a cross waste shale conveyer H is located below and adjacent to the outlet end of the retort B.

A pair of journal brackets 155 are supported on the longitudinal angle irons 46 and 47. A shaft 156 is journaled in the brackets 155 and has fastened thereto the four driving sprocket chain wheels 157. Journal brackets 160 and 160$^a$ extend respectively from the vertical angle irons 28 and 21 and have journaled therein the cross shaft 161. The latter has fastened thereto four idler sprocket chain wheels 162. A pair of journal brackets 163 are fastened to the vertical angle irons 24 and 25. A shaft 164 is journaled in the journal brackets 163 and has fastened thereto the four idler sprocket chain wheels 165. A pair of journal brackets 168 are fastened to the vertical angle irons 24 and 25. A shaft 169 is journaled in said brackets 168 and has fastened thereto the four idler sprocket chain wheels 170. The chains of the conveyer C contact with the idler sprocket chain wheels 162, 165 and 170 and are in contact with and driven by the driving sprocket chain wheels 157. The conveyer C moves through both of the retorts A and B upon the respective similar separating plates 71 and 71$^b$ thereof, and the chains of the conveyers are maintained in proper operative position in the retorts by means of the guide strips 81, 82 and 84.

A spur gear 175 is fastened to the shaft 156 adjacent to one end thereof. Journal brackets 176 are fastened to the angle irons 28 and 36. A shaft 177 is journaled in the brackets 176. A pinion 178 is fastened to the shaft 177 and meshes with the spur gear 175. A spur gear 179 is fastened to the shaft 177. A pair of journal brackets 180 extend from the angle irons 35 and 38 and have journaled therein the driving shaft 181. A pinion 182 is fastened to the shaft 181 and meshes with the spur gear 179. An eccentric 183 with the rod 184 has its body portion fastened to the shaft 181. A bell crank with the arms 185 and 186 is fastened to the shaft 112, and the arm 185 is pinned to the eccentric rod 184. The shaft 112$^b$ similar to 112, of the retort B has fastened thereto the crank 187 and a link 188 has one of its ends pinned to the arm 186 and its other end is pinned to the crank 187. A driving pulley 190 is fastened to the shaft 181.

To use the retorts fresh powdered shale or other material to be treated is fed into the feeding and preheating hopper 140 by means of the cross conveyer E, and into the feeding and preheating hopper 150 by means of the cross conveyer F. The driving pulley 190 is next turned by a belt not shown, by means of which the driving sprocket chain wheels 157 are turned through the interposed gearing. By this means the conveyer C is moved in the direction of the arrow I in and through the retort A and in the direction of the arrow J in and through the retort B. After both the retorts are charged with the fresh powdered shale or other material, jets of gas flowing from the openings 129 of the gas heaters 120 to 128 of both retorts A and B, are lit by applying a light through the openings of the air register 134. The shale in the vaporizing chamber A$^1$ of the retort A and the vaporizing chamber B$^1$ of the retort B is heated and the vapors generated escape through the vapor outlet pipes 132 and 132$^b$ and are conducted to a condenser or condensers not shown, where the condensible portions of the vapor are liquefied, producing oil which is the primary object of the invention.

The conveyer C as it moves through the vaporizing chambers A$^1$ and B$^1$, draws the powdered shale in portions adjacent to each other over the heated separating plates 71 and 71$^b$. In so doing the material in each of the compartments D$^1$ and D$^2$ is pushed by the rear wall of each compartment, and as the skin friction of the particles in contact with the separating plates 71 and 71$^b$ exceeds the friction of the particles with each other, they rise from the bottom portion of each compartment at its rear end and from a point somewhat distant from the front wall of each compartment as indicated in Fig. 7, baring the front portion of each compartment. Simultaneously with the flowing of the particles of the shale to form elongated ridges, their peaks come into contact with the oscillating screens 95 and 96 in each retort, and the particles of material forming the peaks of the ridges drop into the forward empty portions of the compartments into which they were originally dumped and into the forward portion of the next adjacent compartment to the rear. By this means practically each of the particles of the shale in the compartments is brought into contact with the heated separating plate 71 and 71$^b$, constituting an automatic stirring of the particles of shale. The screens 95 and 96 receive their oscillations from the arms 113. The latter are oscillated by means of the arm 185 which in turn is oscillated by the eccentric rod 184. The latter receives its oscillations from the eccentric 183 fastened to the driving shaft 181. The shale that has been heated in the retorts A and B to produce oil, is dumped respectively on the cross conveyers G and H and disposed of. While the fresh powdered shale is being heated in the vaporizing chambers A$^1$ and B$^1$ of the retorts, the product of combustion of the gas heaters 120 to 128 of each retort flow through the waste gas outlet conduits 133 and 152 through the feeding and preheating hoppers 140 and 150 and thereby preheat the shale in said hoppers.

It will be noted that in carrying out the steps of the process, the powdered or granulated shale has each of the particles thereof consecutively and continuously heated. The said heat increases during the flowing and translation of the shale. The products of combustion of the heating agent are used to preheat the shale. The vapors generated are collected and the condensible portions thereof are condensed to produce oil. The residue of the shale is disposed of.

It is to be understood that various changes may be made in the process without departing from the spirit of the invention and the steps and apparatus described are to be taken as illustrative and not limitative of the invention.

Having described my invention what I desire to secure by Letters Patent and claim is:

1. The process of treating powdered or granulated shale to produce oil, consisting in separating said shale into portions adjacent to each other, translating said portions in one direction and simultaneously subjecting said portions to heat, collecting the vapors generated from the shale and forcing shale from one portion thereof to mix with the next adjacent portion simultaneously with the translation of the portions.

2. The process of treating powdered or granulated shale to produce oil consisting in preheating said shale, then separating said shale into portions adjacent to each other, translating said portions and subjecting them to heat, causing the particles of shale of each portion to flow upwardly from its front part to its rear, then forcing a part of the elevated particles downwardly and forwardly in each portion and forcing another part of each portion to mix with the shale of the next adjacent portion.

3. The process of treating powdered or granulated shale to produce oil, consisting in preheating the shale, dividing the shale into portions adjacent to each other, translating said portions in one direction, thereby causing the forward contents of each portion to rise and move to the rear part thereof, forcing a part of the raised part of each portion back to the front end thereof and forcing another part of the raised portion to the front end of the next adjacent portion, heating said shale while it is moving and collecting the vapors generated from the shale.

4. The process of treating powdered or granulated shale to produce oil consisting in preheating the shale, dividing the shale into portions adjacent to each other, translating said portions in one direction, thereby causing the forward contents of each portion to rise and move to the rear part thereof, forcing a part of the raised portion of each portion back to the front end thereof and forcing another part of the raised portion to the front end of the next adjacent portion, subjecting said shale to heat in increasing amounts during the translation thereof and collecting the vapors generated from the shale.

Signed at the borough of Brooklyn, city of New York in the county of Kings and State of New York, this 23d day of November A. D. 1921.

GASTON A. BRONDER.